June 16, 1959     R. F. McLEAN ET AL     2,890,908
POWER OPERATED LUGGAGE COMPARTMENT FOR MOTOR VEHICLES
Filed Jan. 18, 1956     3 Sheets-Sheet 1
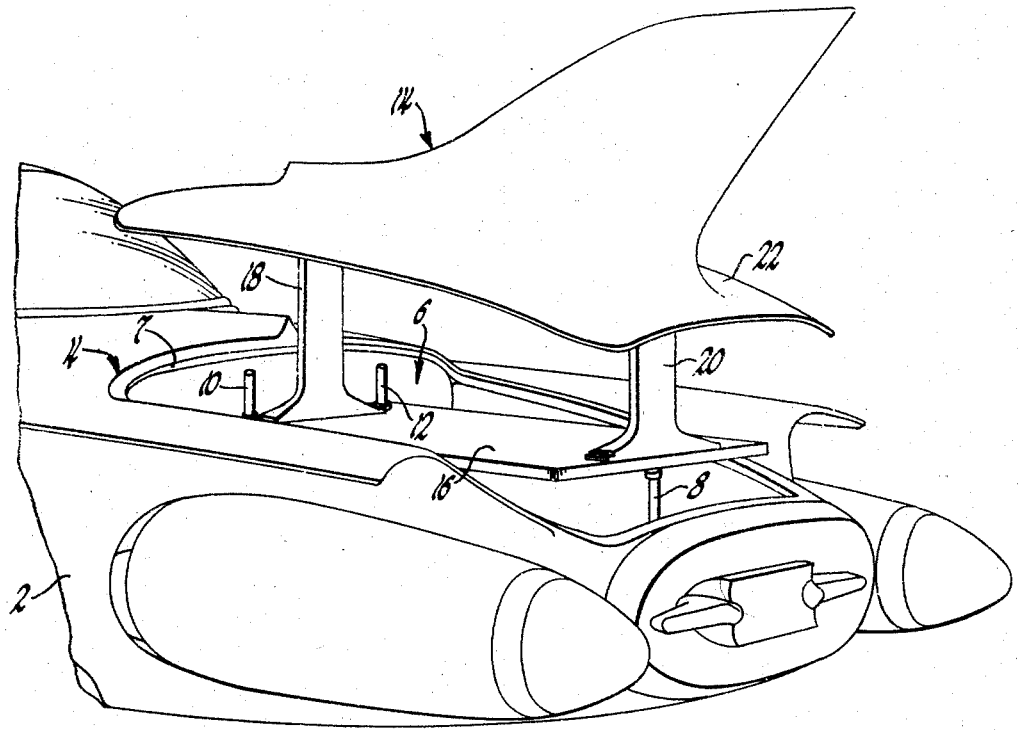
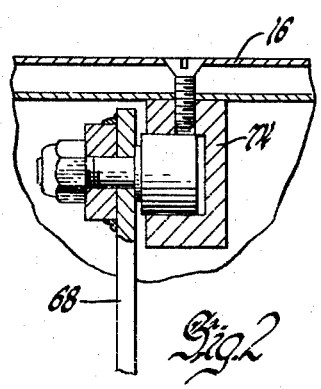
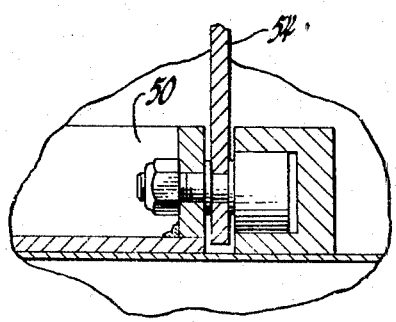
INVENTORS
Robert F. McLean &
BY Edward G. Podolan
Paul Fitzpatrick
ATTORNEY

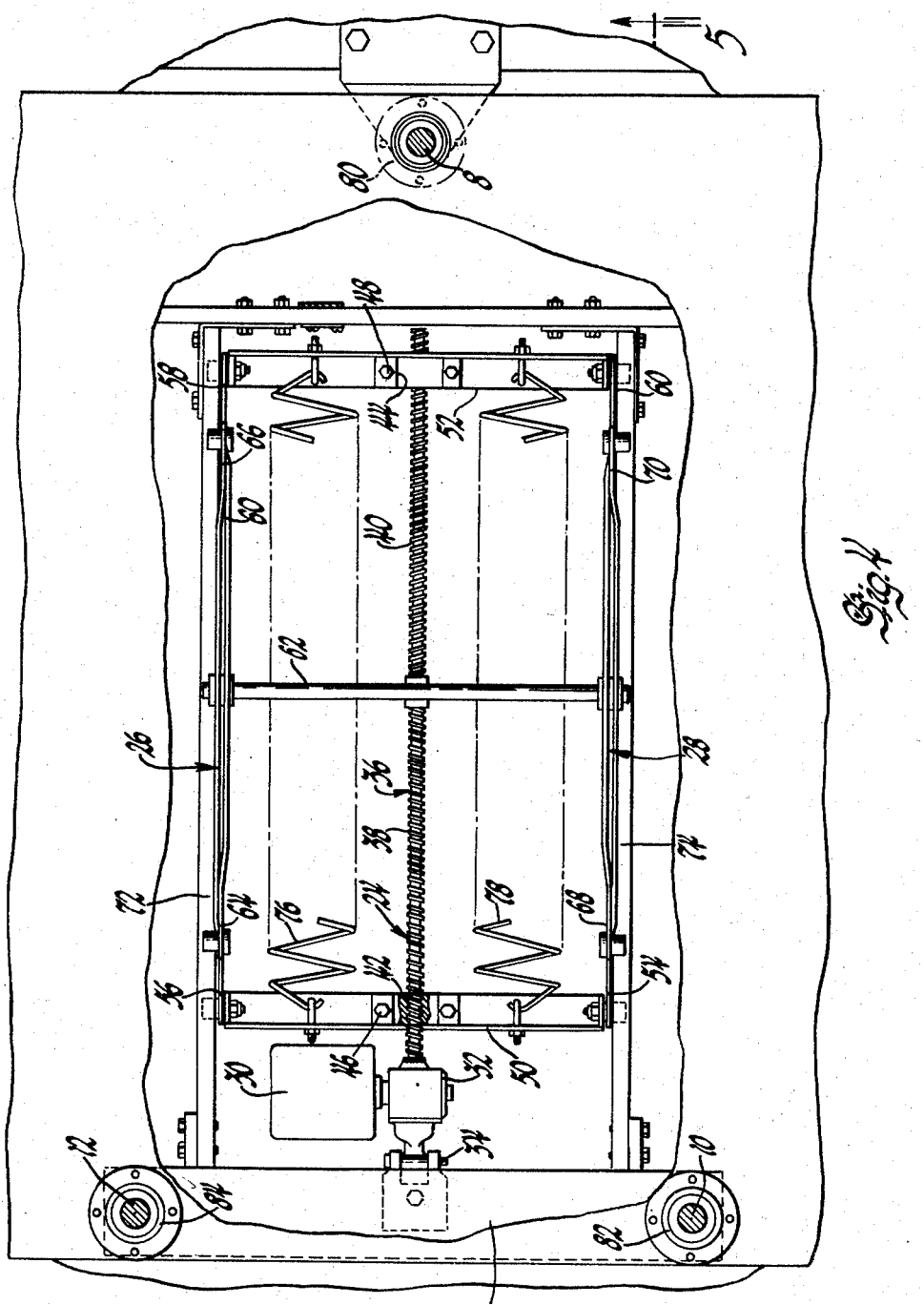

June 16, 1959 R. F. McLEAN ET AL 2,890,908
POWER OPERATED LUGGAGE COMPARTMENT FOR MOTOR VEHICLES
Filed Jan. 18, 1956 3 Sheets-Sheet 3
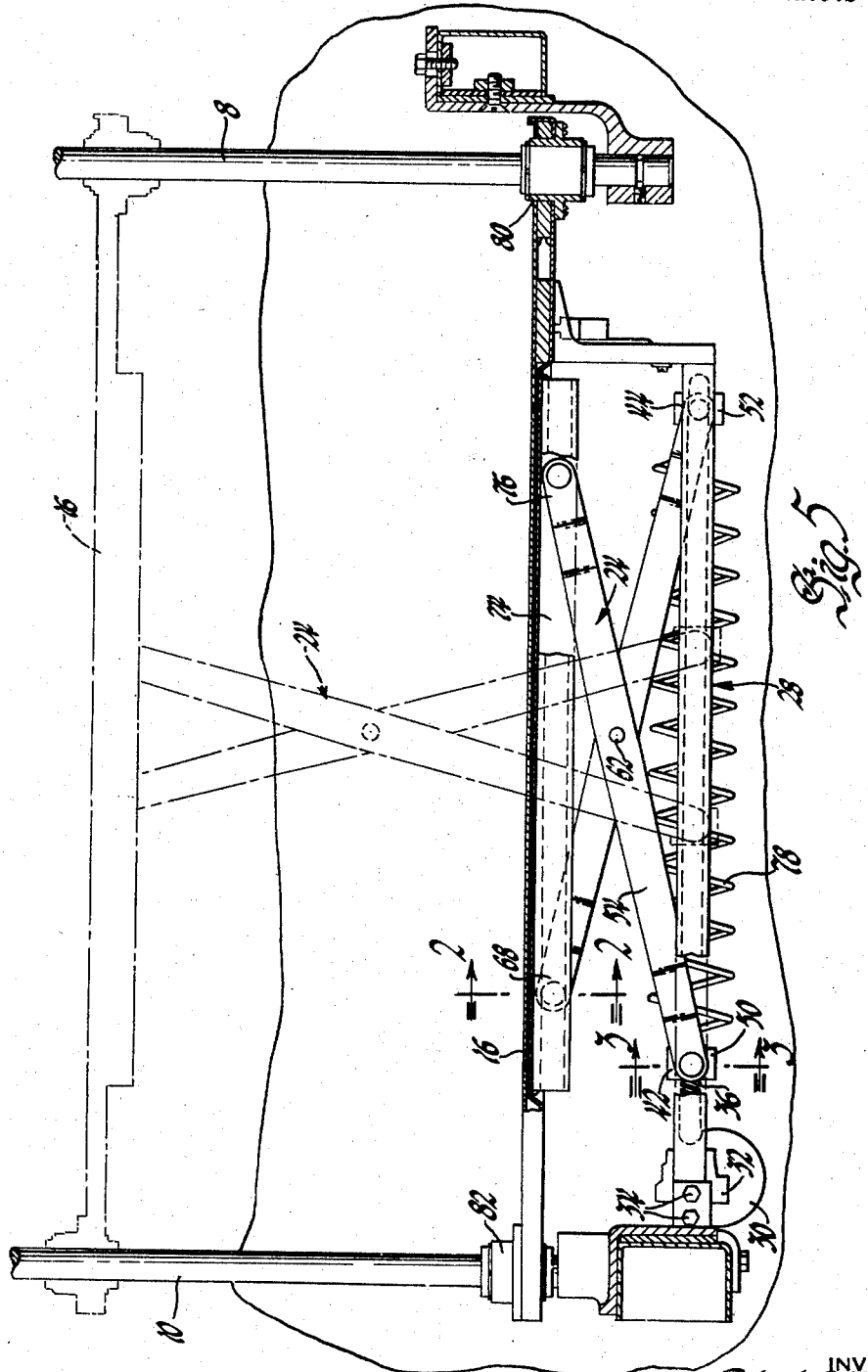
INVENTORS
Robert F. McLean &
BY Edward G. Podolan
Paul Hefpatrick
ATTORNEY

United States Patent Office 2,890,908
Patented June 16, 1959

2,890,908
POWER OPERATED LUGGAGE COMPARTMENT FOR MOTOR VEHICLES

Robert F. McLean, Oak Park, and Edward G. Podolan, St. Clair Shores, Mich., assignors to General Motors Corporation, Detroit, Mich., a corporation of Delaware Application January 18, 1956, Serial No. 559,885

11 Claims. (Cl. 296—37)

This invention relates to vehicle bodies and more particularly to vehicle body luggage compartment construction.

An object of the present invention is to provide an improved luggage compartment construction for vehicle bodies.

Another object is to provide a vehicle body having a luggage compartment wherein the luggage supporting platform is vertically elevatable to a position permitting greater ease of loading and unloading therefrom.

A further object is to provide a vehicle body wherein the luggage compartment platform and deck lid assembly are formed as a unitary structure which is vertically displaceable from a normally closed position to an elevated open position permitting sidewise access to the platform.

Still another object is to provide a structure of the stated character having power operated raising and lowering mechanism.

A still further object is to provide a novel and improved power operated mechanism for the platform and deck lid assembly.

These and other objects, advantages and features of the invention will become more fully apparent as reference is had to the accompanying specification and drawings wherein:

Fig. 1 is a fragmentary perspective view of the rear portion of a vehicle body incorporating the invention, wherein the unitary luggage platform and deck lid are shown in open position.

Fig. 2 is an enlarged fragmentary sectional view looking in the direction of arrows 2—2 of Fig. 5.

Fig. 3 is an enlarged fragmentary sectional view looking in the direction of arrows 3—3 of Fig. 5.

Fig. 4 is a plan view illustrating the form and arrangement of the elevating mechanism; and Fig. 5 is an enlarged side elevational view partly in section looking in the direction of arrows 5—5 of Fig. 4.

Referring now to the drawings and particularly Fig. 1, there is illustrated a vehicle body shell 2 which is provided at its upper rear quarter with an upwardly and rearwardly facing generally rectangular opening 4 which defines the boundary of the luggage compartment 6. Opening 4 is formed with a continuous channel shaped perimeter 7. Disposed within compartment 6 and connected rigidly to the vehicle are three vertically extending guide pillars 8, 10 and 12. Pillars 10 and 12 are arranged in spaced apart lateral alignment at the forward end of compartment 6, while pillar 8 occupies a position near the rearward end of compartment 6. Slidably disposed on pillars 8, 10 and 12 is a unitary luggage platform and deck lid assembly 14. Assembly 14 comprises a generally rectangular flat platform 16 having longitudinally spaced vertically extending struts 18 and 20 rigidly connected on its upper surface. Struts 18 and 20, in turn, are connected to the lower surface of deck lid 22. The perimeter of lid 22 is shaped to match the perimeter 7 of opening 4, while the outer surface of the lid is contoured to conform with the streamlined configuration of body 2.

Unitary assembly 14 is vertically movable on guide pillars 8, 10 and 12, by a mechanism shortly to be described, from a closed position wherein deck lid 22 closes the opening 4, to a raised position wherein platform 16 is accessible from either side or the rear of the vehicle.

As seen in Figs. 4 and 5, in accordance with one feature of the invention, the deck lid assembly elevating mechanism comprises a screw jack assembly 24 and a pair of laterally spaced apart scissors structures 26 and 28. Screw jack assembly 24 includes a remotely operable reversible electric motor 30 having a driving head 32 which is pivotally connected to the vehicle at 34. Driving head 32 actuates a longitudinally extending screw shaft 36 which is provided with right hand threads 38 through one half of its length and left hand threads 40 through the other half of its length. A pair of collars 42 and 44 are threadably disposed on portions 38 and 40, respectively. Because of the opposite threading at either end of shaft 36, rotation thereof in one direction causes collars 42 and 44 to move simultaneously toward while rotation thereof in the other direction causes collars 42 and 44 to move simultaneously away from each other. Connected to collars 42 and 44 by bolts 46 and 48 are a pair of transversely extending angle brackets 50 and 52. At its opposite ends, bracket 50 is pivotally connected to the lower ends of legs 54 and 56 of scissors structures 26 and 28, respectively (Fig. 3). The opposite ends of brackets 52, in turn, are similarly pivotally connected to the lower ends of the other legs 58 and 60 of scissors structures 26 and 28, respectively. At their midportions, both legs of each scissors structure are pivotally connected by a common transversely extending rod 62. The upper ends 64, 66, 68 and 70 of the scissors legs are, in turn, pivotally connected to longitudinally extending rails 72 and 74 (Fig. 2), which are secured on the undersurface of luggage platform 16. A pair of heavy coil springs 76 and 78 are disposed in tension between brackets 50 and 52 to assist the operation of the screw jack assembly during the elevating cycle.

In accordance with another feature of the invention, platform 16 is provided with cylindrical housings 80, 82 and 84, in which are disposed anti-friction bushings which embrace guide pillars 8, 10 and 12. Bushings 80, 82 and 84 are preferably self-aligning to assure smooth vertical movement of assembly 14 and to prevent binding resulting from unequal load distribution on platform 16.

In practice, the structure is operated by a remote switch which is preferably located on the vehicle instrument panel, not shown, or some other convenient location in the passenger compartment. Thus, when the motor 30 is rotated in one direction, screw threads 38 and 40 cause collars 42 and 44 to move simultaneously toward each other causing brackets 46 and 48 to move similarly. This, in turn, causes the scissors structures 26 and 28 to move from the position shown in solid lines in Fig. 5 to the position shown in dotted lines, as a result of which platform 16 is moved from the retracted position shown in solid lines to the extended position shown in dotted lines. As seen in Fig. 1, when platform 16 is in the extended position, the available storage space between the platform and the undersurface of deck lid 22 is readily accessible from either the sides or the rear of the vehicle. After loading, the platform and deck lid assembly move downwardly as a unit upon energization of motor 30 in the opposite direction. When fully retracted, the peripheral edge of the deck lid seats in the peripheral channel 7 of the body 2 to seal the compartment 6.

From the foregoing, it will be seen that a novel deck lid and luggage compartment construction has been provided. It is to be particularly noted that the construction affords substantially improved accessibility for ease of loading and unloading as compared with conventional constructions. In addition, the straight line path of the lid assures a positive seal between the lid and the body.

While but one embodiment of the invention has been shown and described, it will be apparent that numerous changes and modifications may be made therein. It is, therefore, to be understood that it is not intended to limit the invention to the embodiment shown, but only by the scope of the claims which follow.

We claim:

1. In a motor vehicle, the combination of a body having a luggage compartment opening, a closure for said opening, a luggage platform vertically spaced below said closure and rigidly connected thereto through strut means to form a unitary structure, means on said vehicle for guiding said structure in a vertical path, and power operated mechanism for actuating said structure upwardly and downwardly on said guide means.

2. In a motor vehicle, the combination of a body having a luggage compartment opening, a closure for said opening, a luggage platform vertically spaced below said closure and rigidly interconnected thereto through a pair of spaced strut members to form a unitary structure, means on said vehicle for guiding said structure in a vertical path, and power operated mechanism for actuating said structure upwardly and downwardly on said guide means.

3. In a motor vehicle, the combination of a body having a luggage compartment opening, a lid for said opening, a substantially rectangular platform vertically spaced below said lid, a pair of strut members rigidly interconnecting said lid and said platform, said strut members being located on said platform at the opposed ends thereof mediate the corner at such ends, a plurality of pillars on said vehicle for guiding said platform and lid in a vertical path, and power operated mechanism for actuating said platform and lid structure upwardly and downwardly on said guide means.

4. In a motor vehicle, the combination of a body having a luggage compartment, means forming an opening in the wall of said body for access to said compartment, a lid for said opening, a substantially rectangular platform vertically spaced below said lid, a pair of strut members rigidly connecting said lid and said platform, said strut members being located on said platform at the opposed ends thereof mediate the corners at such ends, a plurality of pillars on said vehicle for guiding said platform and lid in a vertical path, and power actuated mechanism for actuating said platform and lid structure upwardly and downwardly on said guide means.

5. In a motor vehicle, the combination of a body having a luggage compartment, means forming an opening in the wall of said body for access to said compartment, a lid for said opening, a substantially rectangular platform vertically spaced below said lid, a pair of strut members rigidly connecting said lid and said platform, said strut members being located on said platform at the opposed ends thereof mediate the corners at such ends, a plurality of pillars fixedly based on said vehicle for guiding said platform and lid in a vertical path, and power operated mechanism for actuating said platform and lid structure upwardly and downwardly on said guide means.

6. In a motor vehicle, the combination of a body having a luggage compartment opening, a lid for said opening, a luggage platform vertically spaced below said lid and rigidly connected thereto through strut means, a plurality of vertically extending pillars mounted on said vehicle, means on said platform cooperating with said pillars to guide the latter in a vertical path, and remotely controllable power operated mechanism for actuating said platform and lid from a closed position wherein said lid covers said opening to an open position wherein said platform is elevated to a position providing sidewise and endwise accessibility.

7. In a motor vehicle, the combination of a body having a luggage compartment opening, an elevatable luggage platform, a deck lid spaced vertically upwardly of said platform and rigidly connected thereto through strut means, a plurality of vertically extending pillars mounted on said vehicle, means on said platform cooperating with said pillars to guide the latter in a vertical path, and remotely controllable power operated mechanism for actuating said platform and lid from a closed position wherein said lid covers said opening to an open position wherein said platform is elevated to a position providing sidewise and endwise accessibility.

8. In a vehicle body having a luggage compartment, an elevatable platform in said compartment, a lid for said compartment overlying said platform in vertically spaced relation, strut means rigidly interconnecting said platform and lid, guide means for said platform, a power actuated mechanism for raising and lowering said platform, said mechanism comprising a scissors structure connected to said platform and a motor driven screw jack for actuating said scissors structure.

9. In a vehicle body having a luggage compartment, a linearly elevatable platform in said compartment, a lid for said compartment overlying said platform in vertically spaced relation and rigidly connected thereto through strut means, guide means for said platform, and power actuated mechanism for raising and lowering said platform, said mechanism comprising a scissors structure connected to said platform and a motor driven screw jack for actuating said scissors structure.

10. In a vehicle body having a luggage compartment, an elevatable platform in said compartment, a lid for said compartment overlying said platform in vertically spaced relation and rigidly connected thereto through strut means, guide means defining the path of said platform, and power actuated mechanism for raising and lowering said platform, said mechanism comprising a plurality of scissors mechanisms operatively engaging said platform, a motor driven screw jack, and means connecting said screw jack to said scissors mechanism whereby rotation of said jack in one direction causes said scissors mechanism to expand vertically and operation of said screw jack in the other direction causes said scissors mechanism to expand horizontally.

11. In a vehicle body having a luggage compartment, an elevatable platform in said compartment, a lid for said compartment overlying said platform in vertically spaced relation and rigidly connected thereto through strut means, vertically disposed guide means for said platform, power actuated mechanism for raising and lowering said platform, said mechanism comprising a screw jack having right hand threads extending through one half of its length and left hand threads through the other half of its length, a reversible electric motor for driving said screw jack, a pair of threaded driven members engaging said right and left hand threads respectively, said driven members being linearly displaced in opposite directions upon rotation of said jack, a pair of transversely spaced scissors mechanisms, means connecting said driven members with the lower legs of said scissors, and means connecting the upper legs of said scissors to said platform.

References Cited in the file of this patent

UNITED STATES PATENTS

| | | |
|---|---|---|
| 586,641 | Underwood | July 20, 1897 |
| 593,806 | Keenan | Nov. 16, 1897 |
| 722,166 | Taft | Mar. 3, 1903 |
| 1,030,410 | Kees | June 25, 1912 |
| 1,261,633 | Shuford | Apr. 2, 1918 |
| 1,458,032 | Cornell | June 5, 1923 |
| 1,664,517 | Liebl | Apr. 3, 1928 |
| 2,522,441 | Galloway et al. | Sept. 12, 1950 |
| 2,706,102 | Cresci | Apr. 12, 1955 |